United States Patent [19]

Close

[11] 4,347,268

[45] Aug. 31, 1982

[54] NOVEL FLUOROELASTOMER FILM COMPOSITIONS CONTAINING VINYL COPOLYMERS AND METHOD FOR THE PREPARATION THEREOF

[75] Inventor: Donald Close, Stow, Ohio

[73] Assignee: David Hudson, Inc., Stow, Ohio

[21] Appl. No.: 178,896

[22] Filed: Aug. 18, 1980

[51] Int. Cl.$^3$ .................. C08L 27/16; C08L 27/06; C08L 31/04

[52] U.S. Cl. .................. 427/385.5; 525/198; 525/199; 525/194; 428/422

[58] Field of Search .............. 525/198, 199, 194; 427/385.5; 260/30.4 R, 31.2 R, 32.8 R

[56] References Cited

U.S. PATENT DOCUMENTS

| | | | |
|---|---|---|---|
| 2,777,783 | 1/1957 | Welch | 525/199 |
| 3,324,069 | 6/1967 | Koblitz | 525/199 |
| 3,340,222 | 9/1967 | Fang | 525/199 |

OTHER PUBLICATIONS

Bowman "Solution Coatings of Viton", DuPont Viton Bulletin No. 16, 1966.
Hackett "Adhering Viton to Metal During Vulcanization", DuPont Viton Report VT-450.1.
Alexander, "A Capsule View of the A, B and E Types of Viton", DuPont Viton Report VT-000.1 (R2).
Arnold et al., *Rubber Chemistry and Technology*, "Fluoroelastomers", pp. 619-653.

*Primary Examiner*—Carman J. Seccuro
*Attorney, Agent, or Firm*—Hamilton, Renner & Kenner

[57] ABSTRACT

The invention herein disclosed provides a method for preparing fluoroelastomer film compositions including the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a vinyl copolymer to the gum solution, evaporating the solvent and leaving a film. A method is also provided for adhering fluoroelastomer film compositions, devoid of metallic oxides, to substrates which includes the steps of dissolving the fluoroelastomer gum in a solvent, adding a vinyl copolymer to the gum solution, coating the substrate with the fluoroelastomer gum-vinyl copolymer solution, evaporating the solvent and leaving a cured film firmly adhered to the substrate. The fluoroelastomer film compositions disclosed herein are also novel and can be used to coat a variety of substrates thereby providing other novel, useful articles.

4 Claims, No Drawings

NOVEL FLUOROELASTOMER FILM COMPOSITIONS CONTAINING VINYL COPOLYMERS AND METHOD FOR THE PREPARATION THEREOF

TECHNICAL FIELD

The present invention is directed toward novel fluoroelastomer film compositions, which compositions exhibit greatly improved adhesion with a variety of substrate materials. A method for preparing the fluoroelastomer films and for improving the adhesion between these films and various substrates is also set forth. A number of useful articles can be obtained by applying a coating or envelope of the fluoroelastomer film compositions of the present invention.

Fluorocarbon elastomers comprise copolymers of vinylidene fluoride and hexafluoropropylene, known since about 1956, and terpolymers of vinylidene fluoride, hexafluoropropylene and tetrafluoroethylene, known since about 1958. Generally, these compositions exhibit a resistance to heat, aliphatic and aromatic hydrocarbons, chlorinated solvents, petroleum fluids and many mineral acids. Although not universally resistant to solvents or chemicals, their resistance to such compounds is superior to most other elastomers. They can be processed with existing technology and apparatus into solid or solid walled articles, however, given their relatively high cost, use of fluoroelastomers has been somewhat curtailed and directed more to specialty applications.

BACKGROUND ART

Known fluoroelastomer compositions comprise the fluorocarbon elastomer or gum, a metal oxide, a filler, curing agents and processing aids. Converting the rubbery raw gum fluoroelastomer to vulcanizates requires primary crosslinking or curing agents such as the amines, dithiols, peroxides or certain aromatic polyhydroxy compounds. Alternatively, radiation can be used. With each of these systems a basic metal oxide is required, such as the oxides of magnesium, calcium, lead or zinc, as an acid acceptor. Fillers are employed for their usual purposes those being to reinforce the elastomer and reduce cost. Processing aids are also employed for conventional purposes.

To compound a fluoroelastomer for coating purposes, it is customary to mix the gum with a desired filler and a metallic oxide on a mill, working the additives well into the gum. After removal from the mill, a solvent such as a low molecular weight ester or ketone is added followed by an aliphatic amine. The amine initiates curing which requires that the composition be utilized within several hours.

In another curing system, a ketimine is added to the foregoing mill mix with the solvent. The resulting mixture is relatively stable so long as moisture is not present. Ketimines are also utilized to cure epoxy resins and in the presence of moisture from the air or otherwise, break down to form an amine and a ketone. Once the amine has been released, the fluoroelastomer begins to cure, providing a working life of several hours.

Yet another system includes the addition of the curative with the gum, filler and metallic oxide on the mill. Curatives such as hexamethylene diamine carbamate, ethylene diamine carbamate or dicinnamylidene-1,6-hexanediamine, commonly referred to as the DIAK's, are used. Care must be exercised that the temperature on the mill does not rise too high in order to avoid premature curing. The resulting mixture can then be processed on conventional apparatus or it can be mixed with a solvent to be used for coating work. Heat completes the final cure in this system as it also does with the preceding systems.

When used as a coating, several problems exist. A primary one is adhesion; pretreatment of the substrate is required including cleaning and priming operations. Another problem is that settling of the metallic oxide will occur during use of the coating material, giving a nonuniform dispersion of the metallic oxide and nonuniform cure. Working life is usually relatively low requiring the manufacturer to compound the fluoroelastomer and use it the same day, often within hours. Use of ketimines, for instance, necessitates airless spraying and closed dipping tank systems in order to avoid premature curing prior to the application. Where solvents are not employed, for production of solid products, mill mixing rarely results in homogeneous mixtures of the metallic oxide and curative such as DIAK, throughout the gum.

The foregoing fluoroelastomer systems typify the state of the art and although the compositions have been utilized to form solid products as well as coated products, use as a coating has had its shortcomings. Coatings obviously provide a fluoroelastomer surface without the expense of the entire article being a fluoroelastomer. In other instances, where size, strength or location of the article militates against solid elastomer construction, a coating is the only manner in which the fluoroelastomer can be employed.

Of the systems and techniques known to me, none has provided a composition readily adherable to a plurality of substrates, providing an abrasion resistant coating and without loss of the inherent chemical resistance possessed by the fluoroelastomer. Ideally, a thinner film, on the order of one or more mils (0.025 mm) thickness, that could adhere to a variety of substrates or envelop them, would enable fluoroelastomers to be used in applications where heretofore they have been unfit due either to high costs or poor adhesion.

DISCLOSURE OF THE INVENTION

It is therefore an object of the present invention to provide a novel fluoroelastomer film composition that adheres well to a variety of substrates such as plastics, rubbers, metals, glass, fabrics, fiberglass, wood, paper and the like, is relatively abrasion free and provides a good protection against chemical, fuel and solvent attack.

It is another object of the present invention to provide a method for preparing fluoroelastomer film compositions.

It is yet another object of the present invention to provide a method for adhering fluoroelastomer film compositions to substrates.

It is a further object of the present invention to provide a novel fluoroelastomer film composition, as described hereinabove, that is devoid of metallic oxides.

It is still a further object of the present invention to provide methods, as described hereinabove, that do not require the step of milling or otherwise physically adding metallic oxides to the fluoroelastomer composition.

These and other objects, together with the advantages thereof over the prior art, which shall become apparent from the specification which follows are accomplished by my invention as hereinafter described and claimed.

In general, the method for preparing fluoroelastomer film compositions, according to the present invention, includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a vinyl copolymer to the gum solution, evaporating the solvent and leaving a film.

A method is also provided for adhering fluoroelastomer film compositions, devoid of metallic oxides, to substrates which includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a vinyl copolymer to the gum solution, coating the substrate with the fluoroelastomer gum-vinyl copolymer solution, evaporating the solvent and leaving a film firmly adhered to the substrate. Either of the films resulting by the foregoing methods can optionally be baked at a temperature of at least 100° C. in order to improve film properties. Lastly, the present invention provides for a novel fluoroelastomer cured film composition which is dense and impermeable and comprises a fluoroelastomer gum and a vinyl copolymer.

The methods of the present invention principally allow a fluoroelastomer composition, as a film coating, to adhere to a variety of substrates which they have not adhered to well, if at all, heretofore. The film coatings need not be cured with conventional curing agents commonly employed with fluoroelastomers, epoxies and other polymers. Unlike existing systems, the methods of the present invention are directed toward deleting metallic oxides from the composition and, by so doing, it has been found that adhesion to substrates is greatly improved. The preferred embodiments which follow shall establish the increase in adhesive properties utilizing various vinyl copolymers. A control compound without vinyl copolymers will demonstrate the lack of adhesion which characterizes existing technology.

PREFERRED MODE FOR CARRYING OUT THE INVENTION

Fluorocarbon elastomers utilized in the practice of the present invention include the copolymers of vinylidene fluoride and hexafluoropropylene and the terpolymers of vinylidene fluoride, hexafluoropropylene and tetrafluoroethylene. Fluorocarbon elastomers such as these are commercially available as the Viton brand and Fluorel brand fluoroelastomers. Viton is a registered trademark of E. I. duPont de Nemours & Co. and Fluorel is a registered trademark of 3M Company. Experimental work conducted and reported herein has been with the Viton series specifically including two of the polymers listed in Table I.

TABLE I

| | |
|---|---|
| Viton A | Copolymer of vinylidene fluoride and hexafluoropropylene |
| Viton A-35 | Low viscosity analog of Viton A |
| Viton B | Terpolymer of vinylidene fluoride, hexafluoropropylene and tetrafluoroethylene |
| Viton B-50 | Low viscosity analog of Viton B |
| Viton E-60 | Copolymer of vinylidene fluoride and hexafluoropropylene with broad molecular weight distribution |
| Viton C-10 | Very low viscosity version of Viton A |
| Viton VTR-5362 | A terpolymer of proprietary composition | although not exemplified herein, the present invention could as well be practiced with the other Viton elastomers or the Fluorel elastomers available from 3M.

Compositions of the present invention comprise a gum fluoroelastomer and a copolymer of vinyl chloride and vinyl acetate and are devoid of metallic oxides. In order to demonstrate practice of the present invention, one Viton polymer has been employed and while the examples have not been repeated with each of the six other polymers presented in Table I, it is to be understood that substitutions of one particular polymer for another can be made by those skilled in the art according to the properties characterizing a specific series which properties are desired in the invention composition.

An important aspect of the present invention is that the inherent resistance of the fluorocarbon elastomers to many fuels, hydrocarbons and solvents is not sacrificed to gain the improved adhesion set forth herein. On the contrary, the usefulness of the fluorocarbon elastomers comprising the invention composition will be seen to increase, due to the adhesive properties imparted to the latter. Inasmuch as existing fluorocarbon elastomer compositions have not adhered well, if at all, to very many substrates, the compositions and method set forth herein will provide the ability to coat or envelop these substrates for the first time, providing new and useful products.

The copolymers of vinyl chloride and vinyl acetate utilized in the practice of the present invention have a vinyl chloride content of from about 80 to about 90 percent by weight and a vinyl acetate content of from about four to about eight percent by weight. Each can be modified by the addition of dibasic acids or hydroxyl groups. Suitable resins can be obtained from Union Carbide Corporation under the names vinyl solution resin VYHH, VMCH, VAGH, VMCC and VAGD.

Technical data from Union Carbide indicates that VYHH is a medium molecular weight vinyl chloride-vinyl acetate copolymer resin, that readily dissolves in ketones and other solvents, generally used for coatings. VMCH is an acid-modified vinyl chloride-vinyl acetate copolymer resin of medium molecular weight having solubility characteristics similar to VYHH. VAGH is a hydroxyl modified vinyl chloride-vinyl acetate copolymer also of medium molecular weight and soluble in ketone-aromatic hydrocarbon mixtures. VMCH, like VMCC is modified by interpolymerization with a dibasic acid and, VAGH like VAGD is partially hydrolyzed, VAGD being slightly lower in molecular weight.

The foregoing vinyl copolymers are preferably added to the fluoroelastomer in a solvent such as methylethyl ketone (MEK) in at least a 20 percent solution by weight. For certain spraying operations, the resin can be diluted even further to about a 10 percent solution. The actual amount of resin solids employed is from about one to about five parts by weight, based upon 100 parts of the fluoroelastomer, hereinafter abbreviated phr.

Preparation of the composition according to one method of the present invention requires first that the fluoroelastomer be put into solution with a typical solvent such as MEK, acetone, ethyl acetate, tetrahydrofuran and the like. Next is added the vinyl copolymer also as a solution in one of the foregoing solvents. Most components are mixed for a period of time of from about five to about 15 minutes at room temperature and then applied to the desired substrate. After evaporation of the solvent, the film can be baked to improve properties. Immediate baking is also helpful to shorten the time for evaporation. Suitable baking temperatures range from about 100° C. to 149° C. with corresponding times of two hours to about one hour.

It is important to note that the composition of the present invention does not require the presence of metallic oxides. In fact, for satisfactory adhesion to various substrates better results are obtained when the metallic oxide is omitted.

With respect to fillers, such as carbon black or mineral fillers generally, their presence or absence from the composition does not appear to affect the adhesive properties. Inasmuch as the composition of the present invention does not require the presence of a filler to improve adhesion, unless a filler is otherwise desired, it can be omitted.

The fluoroelastomer composition prepared according to the foregoing process can be used to form coatings, envelopes around other articles, films and the like. When used as a coating or envelope, the underlying support material or substrate is given the protection inherent fluoroelastomers. Moreover, the coating or envelope is generally abrasion resistant and most importantly has a very high degree of adhesion to many substrates which in itself is a major advantage of the present invention.

Fluoroelastomer compositions of the present invention, prepared in the absence of metallic oxides, have been tested by coating metal including aluminum and steel, glass, EPDM and carboxylated nitrile rubber. The solution of the composition can be poured onto or over the substrate. The substrate can be coated via brush, roller, dip, spray or other known techniques for applying solvent coatings. The coated articles have been subjected to a variety of tests to determine the adhesion between fluoroelastomer and substrate and the resistance of the fluoroelastomer to various environments.

A more detailed explanation regarding testing is provided with the examples hereinbelow.

EXAMPLES

In the examples which follow, Viton 5362 was employed with three different vinyl copolymers. In each instance, the Viton gum was first put into solution with methylethyl ketone to form a 20% solution by weight unless otherwise noted. The vinyl copolymer was next put into methylethyl ketone solution at 20% by weight. Respective amounts of the fluoroelastomer and different vinyl copolymer solutions mixed together have been set forth in Table II, all parts being listed by weight. A DuPont formulation was also prepared, as Control A, which was utilized in adhesion, gasohol immersion tests and acid environment tests for comparison with the compositions of the present invention. The control formulation does not constitute the invention claimed herein but rather is to be taken as the state of existing fluoroelastomer technology. The formulation for Control A was: 100 parts of Viton B; 15 parts of Mag Y, a registered trademark of Merck & Co., Inc. for light magnesium oxide; 20 parts of MT black, a carbon black filler; one part of TETA and 540 parts of MEK.

TABLE II

Formulation of Viton 5326 with Vinyl Copolymers

| Ex. No. | Viton 5362 | VMCH | phr | VMHH | phr | VAGH | phr |
|---|---|---|---|---|---|---|---|
| 1 | 97.5 | 2.5 | 2.6 | — | — | — | — |
| 2 | 97.5 | — | — | 2.5 | 2.6 | — | — |
| 3 | 97.5 | — | — | — | — | 2.5 | 2.6 |
| 4 | 97.0 | 3 | 3.1 | — | — | — | — |
| 5 | 97.0 | 3[a] | 3.1 | — | — | — | — |

[a]Dow Corning #3 paint additive added, 0.5 part

In the tests which are reported hereinbelow, a determination of excellent adhesion was made when the film could only be scraped from the substrate with great difficulty with destruction rather than removal of the film. Good adhesion was determined when the film could only be peeled away with difficulty and although scraping was not necessary, the film would stretch beyond its elastic limit and tear. Anything less would readily pull away from the substrate which was poor and unsatisfactory adhesion.

Examples 1, 2 and 3 were poured onto aluminum, glass, steel, carboxylated nitrile and EPDM test panels. The solvent was evaporated and the film coating was baked for one hour at 149° C. Adhesion between the films and all substrates was good. Next, 4.5 mil coatings were formed by pouring 2 gms of the liquid of Examples 1–3 and Control A onto the five substrates, evaporating the solvent and baking for one hour at 149° C. Each dish was then totally immersed in a jar of gasohol and sealed. Two weeks later, the dishes were removed and the film coating examined. The control film was bubbled and had separated from the dish evidencing no adhesion. The film from Examples 1–3 appeared fair as did their adhesion although some loss of adhesion to the aluminum was observed.

Examples 4 and 5 and Control A were used to coat aluminum and glass, the films being baked for one hour at 149° C. and then immersed in gasohol for 14 days. Example 5 differs from Example 4 in that 0.5 part of Dow Corning #3 paint additive comprising a proprietary silicone composition was added in order to improve flow properties and film compatibility. The additive is otherwise not necessary and is not, therefore, part of the present invention. Example 4 and 5 films were somewhat softened but the gasohol had not penetrated. Some loss of adhesion to the aluminum was again evidenced but remained good with the glass, while the Control A film blistered and evidenced no adhesion. Example 5 was also cast into an aluminum weighing dish and tested in a nitric acid environment along with a film from Control A. The environment was created by resting the dish within a glass jar, placing several drops of concentrated nitric acid on the coating and sealing the jar with a polyethylene lid. The coating was thus subjected to liquid and vapor acid environments. After eight days the control film was blistered whereas the film from Example 4 was no different after five weeks despite repeated additions of nitric acid to make up for evaporation. Unprotected surfaces in all samples were badly corroded by the acid. Example 5 was not subjected to any tests.

Based upon the preceding results, effective amounts of the vinyl copolymers range from about one to five phr for Viton 5362. It is believed, on the basis of other work not reported herein, that slightly higher levels could be incorporated with other Vitons such as Viton B.

As has been principally demonstrated herein, combining a conventional fluoroelastomer compound with a vinyl copolymer in the absence of metallic oxides provides films which have an unexpected increase in adhesion properties for various substrates. By employing the methods of the present invention, it will be possible to coat cheaper substrate materials providing a fluoroelastomer exterior whereas heretofore only solid fluoroelastomer articles have been available. In other instances, substrates that are not necessarily inexpensive can be given a coating of the fluoroelastomer film in order to protect them from conditions such as oxidation, attack by chemical solvents and environments and protection from heat, to name a few.

The fluoroelastomer film compositions resulting from the method set forth herein are also believed to be novel, the films being unlike existing films which have contained metallic oxides and have not adhered well to any substrates.

Lastly, the present invention will provide a plurality of novel useful articles which bear a coating or envelope of fluoroelastomer film. Many of these articles without the coating have had utility before, however, in certain environments their life has either been shortened or not possible. Many types of tubing or hose as well as ductwork could be coated to provide chemical resistance. Larger vessels such as tanks could also be coated. Still other uses to which the fluoroelastomer coatings of the present invention could be put include pump diaphragms; O-ring cord stock; gaskets, fabricated seals and expansion joints; coated fabrics for small uses as in safety apparel to others as large as tents or buildings; foams, such as reticulated urethanes to be placed in fuel tanks, or others to be used as chemical filters; various electrical purposes such as transformers, conductive films, solar panels and appliances; heat shields; printing blankets, cable and wire coatings and even as adhesives. In addition to those substrates employed in the specification, other substrates that could be coated including other metals, numerous fabrics, other polymers, both plastic and rubber, foam materials, paper, cardboard, wood, asbestos board and cork. More generally, substantially any surface that can tolerate a thin coating can be protected by the fluoroelastomer compositions of the present invention.

Based upon the foregoing results, it is believed that the methods, compositions and coated articles of the present invention accomplish the objects set forth hereinabove. By employing solvent systems of the fluoroelastomer gum and a vinyl copolymer, good dense films, generally impermeable to chemical attack, and forming a strong bond with underlying substrates can be obtained.

It is to be understood that the specific composition of fluoroelastomer gum selected is not necessarily critical to meeting the objects of the present invention. It should be apparent to those skilled in the art that other fluoroelastomers could be utilized in lieu of those exemplified and disclosed herein. The present invention is not specifically limited to the use of the three vinyl copolymers specified herein inasmuch as others are generally known and could readily be substituted without affecting practice of the invention set forth herein.

It is therefore to be understood that variations of the disclosure fall within the scope of the claimed invention and that the subject invention is not to be limited by the examples set forth herein. They have been provided merely to provide a demonstration of operability and therefore the selection of suitable fluoroelastomers and vinyl copolymers can be determined without departing from the spirit of the invention herein disclosed and described. Moreover, the scope of the invention shall include all modifications and variations that fall within the scope of the attached claims.

I claim:

1. An improved method for preparing fluoroelastomer solutions which can be employed to coat various substrates comprising the steps of:
   dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent; and
   adding a vinyl copolymer selected from the group consisting of vinyl chloride-vinyl acetate copolymer resins, acid modified resins thereof and hydroxyl modified resins thereof to said gum solution;
   the improvement wherein said fluoroelastomer gum and vinyl copolymer solution is devoid of metallic oxides in order to improve adhesion between coatings formed therefrom and various substrates.

2. A method for adhering fluoroelastomer film compositions, devoid of metallic oxides, to substrates comprising the steps of:
   coating the substrate with a fluoroelastomer solution consisting essentially of:
   from about one to five parts by weight of a vinyl copolymer selected from the group consisting of vinyl chloride-vinyl acetate copolymer resins, acid modified resins thereof and hydroxyl modified resins thereof in a solvent and,
   from about five to 95 parts by weight of a fluoroelastomer gum selected from the group consisting of copolymers of vinylidene fluoride and hexafluoropropylene, and terpolymers of vinylidene fluoride, hexafluoropropylene and tetrafluoroethylene in a solvent and
   evaporating said solvent and leaving a film firmly adhered to the substrate.

3. A method, as set forth in claim 1, wherein the amount of vinyl copolymer employed ranges from about one to five parts by weight per 100 parts of rubber.

4. A method, as set forth in claim 1 or 2, including the additional step of baking the film at a temperature of at least 100° C. after the step of evaporating said solvent.

* * * * *